United States Patent
Junkins et al.

(10) Patent No.: US 6,525,727 B1
(45) Date of Patent: Feb. 25, 2003

(54) RENDERING 3D SURFACES THROUGH LIMIT SURFACE PROJECTIONS

(75) Inventors: Stephen Junkins, Portland, OR (US); Adam T. Lake, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/430,621

(22) Filed: Oct. 29, 1999

(51) Int. Cl.[7] ............................................... G06T 17/20
(52) U.S. Cl. ........................ 345/423; 345/420; 345/427
(58) Field of Search ................................. 345/419, 420, 345/421, 423, 427, 428, 441–443, 582, 606, 611

(56) References Cited

U.S. PATENT DOCUMENTS 5,754,182 A * 5/1998 Kobayashi .................. 345/423
6,222,553 B1 * 4/2001 DeRose et al. ............. 345/423

* cited by examiner

*Primary Examiner*—Mano Padmanabhan
(74) *Attorney, Agent, or Firm*—Fish & Richardson P. C.

(57) ABSTRACT

In rendering a 3D surface, a computer obtains an initial digital data set that defines a base mesh coarsely approximating the 3D surface, where the base mesh includes vertices connected to form 2D faces. The computer subdivides the 2D faces of the base mesh one or more times to form one or more subdivision meshes, where each subdivision mesh more closely approximates the 3D surface than each preceding mesh, and where each subdivision mesh includes more vertices than each preceding mesh. For each subdivision mesh, the computer applies a computer-implemented algorithm to the vertices in the subdivision mesh to project the vertices onto a limit surface that represents the actual shape of the 3D surface, where the projected vertices define a projected surface. The computer then renders an image of the projected surface for the subdivision mesh instead of rendering an image of the subdivision mesh itself.

30 Claims, 3 Drawing Sheets

RENDERING 3D SURFACES THROUGH LIMIT SURFACE PROJECTIONS

TECHNOLOGICAL FIELD

This application relates to rendering 3D surfaces in a computer system.

BACKGROUND

Many computer graphics applications render complex three-dimensional (3D) surface geometries by iteratively refining simple, course 3D geometries, known as "base meshes." In general, base meshes are a collection of 3D vertices which are connected via triangular faces to represent a 3D surface. Each base mesh is a course approximation of a more complex, ideal 3D surface, known as a "limit subdivision surface," or "limit surface."

A computer creates an initial "subdivision surface" from a base mesh by applying a computational kernel, known as a "subdivision kernel," to the triangles and vertices in the base mesh. Repeated recursive application of the subdivision kernel yields increasingly smooth meshes that converge at the limit surface as the number of iterations approaches infinity.

Some subdivision techniques, known as "uniform" schemes, apply a given subdivision kernel to all base mesh triangles to achieve a particular subdivision depth. Other subdivision techniques, known as "adaptive" schemes, apply a given subdivision kernel that varies the depth of subdivision among the triangles in the mesh.

Both uniform and adaptive subdivision techniques employ two general types of subdivision algorithms. "Interpolating" algorithms preserve points from one subdivision level to the next. "Approximating" algorithms do not preserve points when subdividing the mesh, but rather create new points that approximate the points in the previous subdivision level. Approximating algorithms are used in many applications because they are relatively simple to implement, they result in smoother surfaces, and they allow the use of memory-efficient and computation-efficient data structures. Interpolating algorithms, on the other hand, offer a more intuitive approach to subdivision, produce fewer discontinuities in 3D surfaces when used with the "crack filling" features of adaptive subdivision schemes, and lead to more visually pleasing and intuitive implementations in geo-morphing applications.

In general, a computer system renders an image of a 3D surface by progressively displaying the points at the various subdivision levels and shading the 2D triangular surface components defined by the points. This often results in unsatisfactory visual effects, such as visible "jumps" between the rendered images of adjacent subdivision surfaces, particularly when an approximating algorithm is used to create the subdivision surfaces. This rendering technique also requires a relatively large amount of computational and memory resources.

SUMMARY

In rendering a 3D surface, a computer obtains an initial digital data set that defines a base mesh coarsely approximating the 3D surface, where the base mesh includes vertices connected to form 2D faces. The computer subdivides the 2D faces of the base mesh one or more times to form one or more subdivision meshes, where each subdivision mesh more closely approximates the 3D surface than each preceding mesh, and where each subdivision mesh includes more vertices than each preceding mesh. For each subdivision mesh, the computer applies a computer-implemented algorithm to the vertices in the subdivision mesh to project the vertices onto a limit surface that represents the actual shape of the 3D surface, where the projected vertices define a projected surface. The computer then renders an image of the projected surface for the subdivision mesh instead of rendering an image of the subdivision mesh itself. Other embodiments and advantages will become apparent from the following description and from the claims.

Other embodiments and advantages will become apparent from the description and claims that follow.

DETAILED DESCRIPTION

Figure 1:
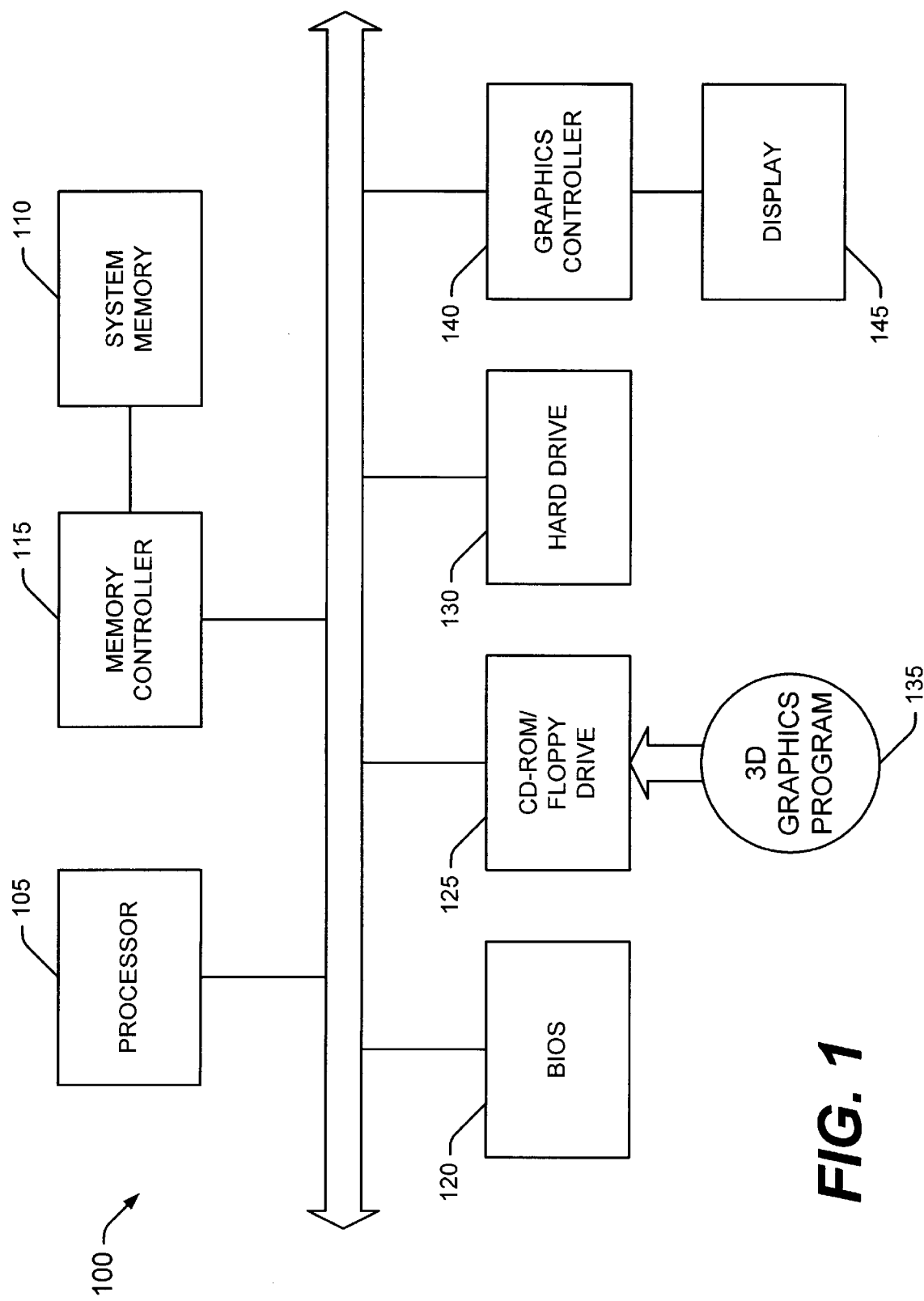
FIG. 1 is a block diagram of a computer system.

FIG. 1 shows a computer system 100 configured for use in generating and rendering images of 3D surfaces. The computer includes at least one central processor 105 that performs the operations necessary to generate and render the 3D surfaces. In most systems, the processor 105 includes or has access to cache memory (not shown), which provides a temporary storage area for data accessed frequently by the processor 105. The computer also includes system memory 110, which stores program instructions and data needed by the processor 105. System memory 110 often includes one or more volatile memory devices, such as dynamic random access memory (DRAM). A memory controller 115 governs the processor's access to system memory 110.

The computer also includes various input and output components, such as a basic input/output system (BIOS) 120, a CD-ROM or floppy disk drive 125, and a hard disk drive 130. A 3D graphics program 135, such as a finite element analysis program or a cartography program stored in the CD-ROM/floppy drive 125 or the hard drive 130, provides program instructions for execution by the processor 105 in generating and rendering 3D images. The 3D graphics program 135 includes instructions for implementing a subdivision surface generator, which allows the processor 105 to create a refined 3D surface from a base mesh that represents a course approximation of a limit surface. A graphics controller 140 receives data representing the 3D surfaces from the processor and renders 3D images on a display device 145, such as a cathode ray tube (CRT) display or a liquid crystal diode (LCD) display.

Figure 2:
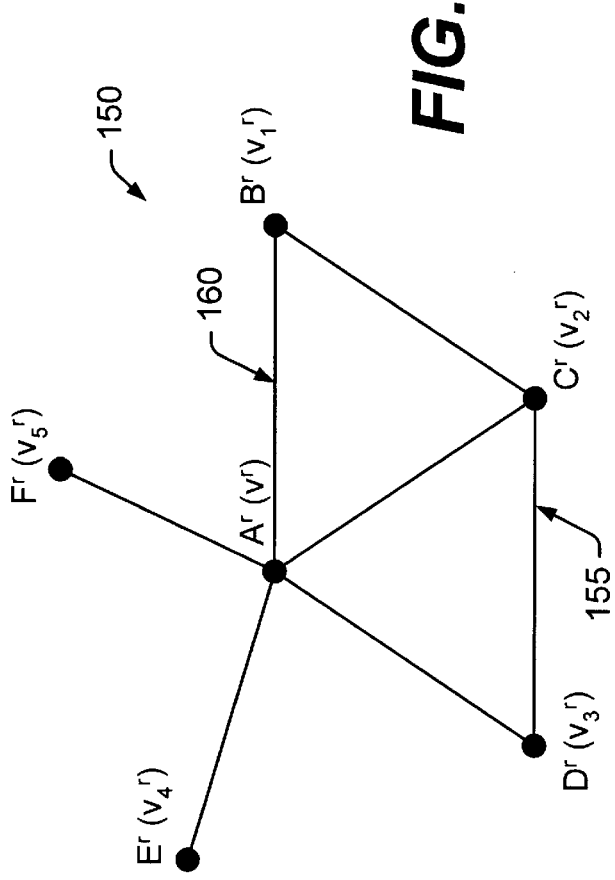
FIGS. 2 and 3 illustrate a technique for subdividing a 3D surface mesh.
Figure 3:
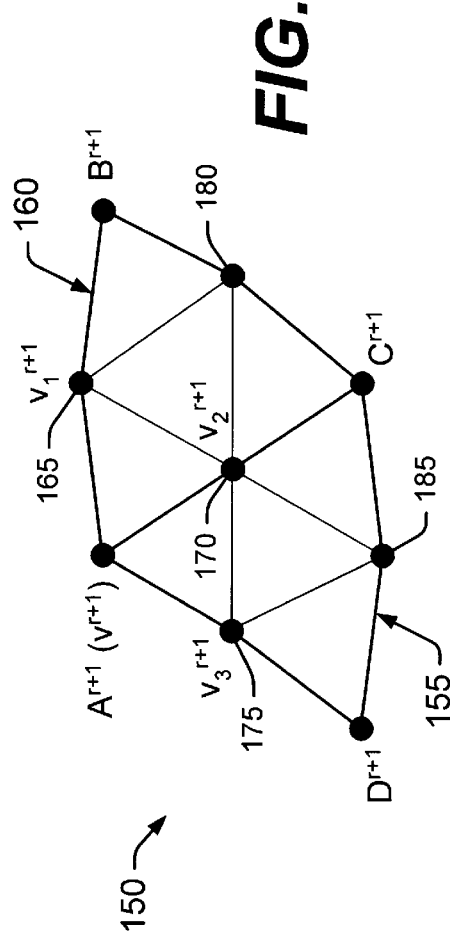

FIGS. 2 and 3 illustrate a technique for subdividing a 3D surface mesh 150. FIG. 2 shows a portion of the surface mesh 150 at a subdivision level r, and FIG. 3 shows the same portion of the surface mesh 150 at a subdivision level r+1. At subdivision level r, four points $A^r$, $B^r$, $C^r$, $D^r$, or vertices, in the mesh 150 define two 2D triangles 155, 160, each forming an individual surface element of the 3D mesh 150.

In subdividing the two triangles 155, 160 of subdivision level r, the computer uses the positions of the vertices $A^r$, $B^r$, $C^r$, $D^r$ to calculate the positions of corresponding vertices $A^{r+1}$, $B^{r+1}$, $C^{r+1}$, $D^{r+1}$ in subdivision level r+1. If the computer uses an interpolating subdivision scheme, the positions of the vertices $A^{r+1}$, $B^{r+1}$, $C^{r+1}$, $D^{r+1}$ in subdivision level r+1 are the same as the positions of the vertices $A^r$, $B^r$, $C^r$, $D^r$ in subdivision level r. If the computer uses an approximating subdivision scheme, the position of each vertex may or may not change between subdivision levels r and r+1.

As shown in FIG. 3, the computer also calculates the position of one additional vertex, or "subdivision midpoint," for each pair of vertices in each of the triangles 155, 160. These subdivision vertices 165, 170, 175, 180, 185 are used to divide each of the triangles 155, 160 of subdivision level r into four smaller triangles. The subdivision midpoints may or may not lie on the edges of the triangles 155, 160 of subdivision level r, depending upon the technique used to subdivide the mesh 150.

A commonly used approximating subdivision scheme, known as "Loop's Subdivision Scheme," calculates the position of each vertex in subdivision level r+1 from the position of the corresponding vertex, if any, in subdivision level r and the positions of nearby vertices in subdivision level r. For example, when Loop's Scheme is applied to the triangles 155, 160 of FIG. 2, the position of vertex $A^{r+1}$ in subdivision level r+1 (FIG. 3) is based upon the position of the corresponding vertex $A^r$ in subdivision level r, as well as the positions of its neighboring vertices $B^r$, $C^r$, $D^r$, $E^r$, $F^r$.

Likewise, Loop's Scheme calculates the position of each subdivision midpoint in subdivision level r+1 from the positions of the four vertices in subdivision level r that lie nearest the subdivision midpoint. For example, the position of subdivision midpoint $v_1^{r+1}$ (FIG. 3) is based upon the positions of vertices $A^r$, $B^r$, $C^r$, and $D^r$ (FIG. 2).

In particular, for each vertex in subdivision level r, Loop's Scheme calculates the position of the corresponding vertex in subdivision level r+1 according to the following equation, known as the "vertex mask" equation:

$$v^{r+1} = \frac{\alpha(n)v^r + v_1^r + \cdots + v_n^r}{\alpha(n) + n},$$

where n represents the number of vertices in the neighborhood surrounding vertex $v^r$, and where $\alpha(n)$ is a weighting function described by the equation:

$$\alpha(n) = \frac{n(1 - a(n))}{a(n)},$$

where $$a(n) = \frac{5}{8} - \frac{(3 + 2\cos(2\pi/n))^2}{64}.$$

In the example shown here, the position of subdivision vertex $A^{r+1}$ ($v^{r+1}$) in subdivision level r+1 is calculated by inserting the positions of vertices $A^r$ ($v^r$), $B^r$ ($v_1^r$), $C^r$ ($v_2^r$), $D^r$ ($V_3^r$), $E^r$ ($v_4^r$), and $F^r$ ($v_5^r$) of subdivision level r into the vertex mask equation above.

Loop's scheme calculates the position of each subdivision midpoint in subdivision level r+1 according to the following equation, known as the "edge mask" equation:

$$v_i^{r+1} = \frac{3v^r + 3v_i^r + v_{i-1}^r + v_{i+1}^r}{8}, \quad \text{for } i = 1, \ldots, n.$$

One advantage of Loop's Scheme is its lack of restriction on the connectivity, or "vertex valence," among the vertices.

Figure 4:
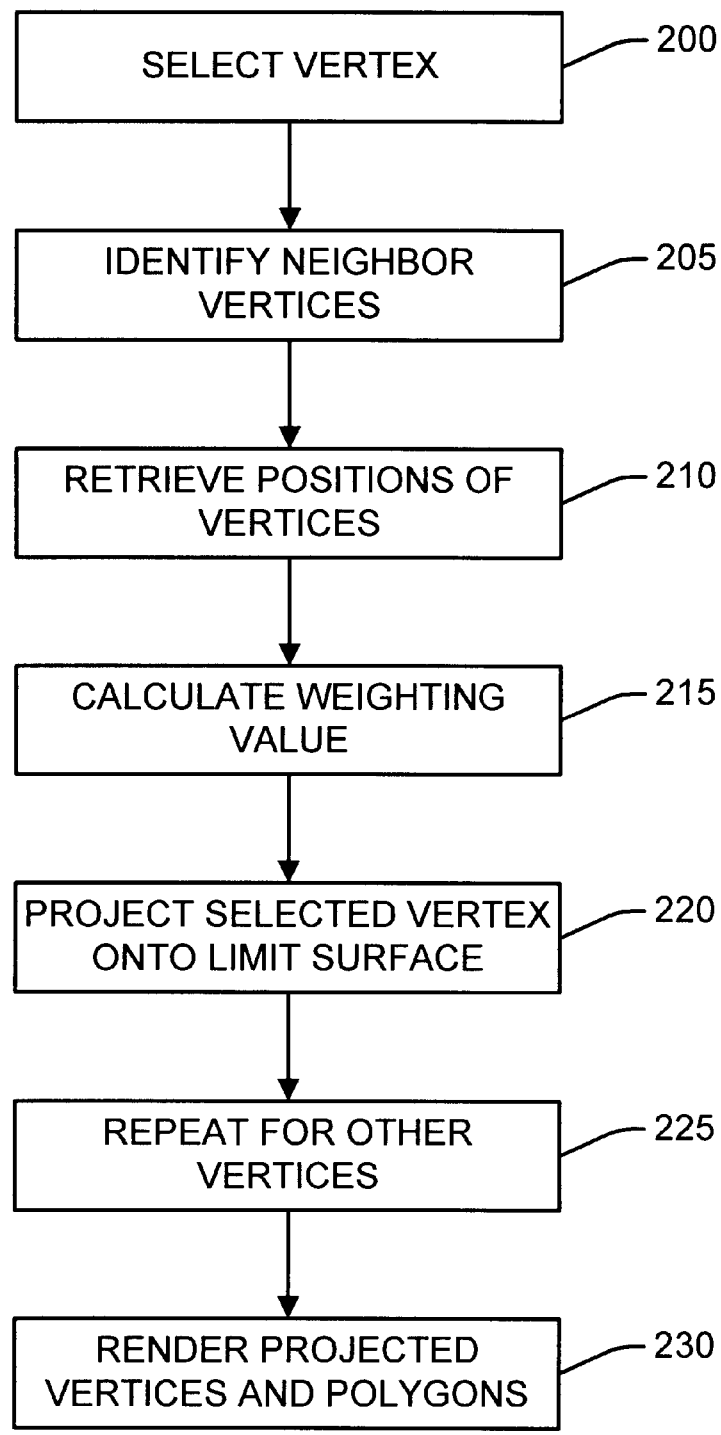
FIG. 4 illustrates a technique for rendering the 3D surface mesh by projecting vertices in the mesh onto a limit surface.

FIG. 4 illustrates a technique for rendering a 3D surface at each of the subdivision levels by applying Loop's Scheme in much the same manner that it is applied in subdividing the 3D surface mesh. Instead of rendering the vertices for each subdivision level, a computer applying this technique projects the vertices onto the limit surface and then renders the projected vertices. When using this technique, the images rendered at the various subdivision levels provide a visual effect similar to that achieved with an interpolating algorithm, yet the computer achieves the surface smoothness and computational efficiency normally associated with an approximating algorithm.

The computer projects the vertices for a particular subdivision level onto the limit surface by applying a modified version of Loop's Scheme to the vertices at this subdivision level. In particular, after defining the positions of the vertices at the subdivision level, the computer applies the Loop's Scheme vertex mask equation to each vertex in the subdivision level. In doing so, the computer substitutes a modified weighting function, $\epsilon(n)$, for the standard weighting function, $\alpha(n)$, described above. Applying the modified vertex mask equation to the vertices yields corresponding vertices on the limit surface. The modified weighting function $\epsilon(n)$ is calculated according to the following equation:

$$\varepsilon(n) = \frac{3n}{4a(n)},$$

where a(n) has the value defined above.

In rendering the 3D surface at a particular subdivision level, the computer selects a vertex (step 200), identifies its neighboring vertices (step 205), and retrieves the coordinates of the vertex and its neighbors (step 210). The computer calculates a weighting value for the selected vertex by inserting the number of neighboring vertices into the modified weighting function $\epsilon(n)$ (step 215). The computer then projects the selected vertex onto the limit surface by inserting the weighting average, the position of the selected vertex, and the positions of the neighboring vertices into the vertex mask equation (step 220). The computer repeats these steps for all other vertices at the current subdivision level (step 225) and then renders the projected vertices and corresponding surface triangles on a display device (230).

Using this modified version of Loop's Scheme to project vertices onto the limit surface before rendering provides several advantages. For example, geo-morphing operations become more efficient and produce better visual effects than are possible with conventional approximating subdivision techniques. With conventional rendering techniques, geo-morphing requires linear translation of all vertices at subdivision level r to the corresponding vertex positions at subdivision level r+1. Conventional geo-morphing techniques also require linear translation of all midpoint vertices created at subdivision level r+1 from the positions of the corresponding parent vertices at subdivision level r.

Projection of vertices onto the limit surface improves computational efficiency during geo-morphing because the vertices at one subdivision level need not be translated to the next subdivision level. Corresponding vertices already exist on the limit surface. Only the new subdivision midpoints require geo-morphing. This results in fewer floating point operations during geo-morphing. Moreover, the limit surface projection technique allows the computer to translate the subdivision midpoints from a projected vertex on the limit surface. As a result, each subdivision midpoint in the geo-morph image is bounded by its parent triangle on the limit surface, thus localizing the geo-morph and improving the visual quality of the geo-morph animation.

Another advantage of limit surface projection is improved crack filling. Projecting the vertices at all subdivision levels onto the limit surface eliminates the visual "jumps" that normally occur under Loop's Scheme without surface projections.

Yet another advantage of limit surface projection is an increase in computational efficiency. Projecting each subdivision level onto the limit surface reduces the number of polygons required to achieve a high level of visual fidelity in the rendered image. By subdividing a base mesh once or twice and then projecting the resulting vertices onto the limit surface, the computer achieves a mesh smoothness that normally occurs only after several more subdivisions. As a result, the computer's graphics pipeline processes fewer data points and thus is more efficient computationally.

A number of embodiments of the invention are described above. A person of ordinary skill will recognize that various modifications are possible without departing from the spirit and scope of the invention. For example, while the invention has been described in term's of Loop's Subdivision Scheme, it also is useful with other subdivision schemes, such as the "Catmull-Clark" and "Doo-Sabin" schemes. Moreover, while the invention has been described in terms of a programmable computer executing program instructions, some implementations are realized in discrete digital components, in application specific integrated circuits (ASICs), and in combinations of these technologies. Accordingly, other embodiments are within the scope of the following claims.

What is claimed is:

1. A computer-implemented method for use in rendering a 3D surface, the method comprising:

obtaining an initial digital data set that defines a base mesh coarsely approximating the 3D surface, where the base mesh includes vertices connected to form 2D faces;

subdividing the 2D faces of the base mesh one or more times to form one or more subdivision meshes, where each subdivision mesh more closely approximates the 3D surface than each preceding mesh, and where each subdivision mesh includes more vertices than each preceding mesh;

for each subdivision mesh, applying a computer-implemented algorithm to the vertices in the subdivision mesh to project the vertices onto a limit surface that represents the actual shape of the 3D surface, where the projected vertices define a projected surface; and for each subdivision mesh, rendering an image of the projected surface instead of an image of the subdivision mesh.

2. The method of claim 1, wherein applying the computer-implemented algorithm includes, for each subdivision mesh, inserting the vertices for the subdivision mesh into a predetermined equation.

3. The method of claim 2, wherein the equation includes a factor that accounts for the projection of the vertices onto the limit surface.

4. The method of claim 1, wherein subdividing includes inserting the vertices from a mesh to be subdivided into a predetermined equation.

5. The method of claim 4, wherein inserting the vertices from the mesh to be subdivided into a predetermined equation includes inserting the vertices into the following equation:

$$v^{r+1} = \frac{\alpha(n)v^r + v_1^r + \cdots + v_n^r}{\alpha(n) + n},$$

where n represents the number of vertices in a neighborhood surrounding a particular vertex $v^r$, where r represents the number of subdivisions applied to the bash mesh to derive the subdivision mesh, and where $\alpha(n)$ is a weighting function described by the equation:

$$\alpha(n) = \frac{n(1 - a(n))}{a(n)},$$

where $$a(n) = \frac{5}{8} - \frac{(3 + 2\cos(2\pi/n))^2}{64}.$$

6. The method of claim 4, wherein applying a computer-implemented algorithm to the vertices in a subdivision mesh to project the vertices onto a limit surface includes:

changing at least one factor in the predetermined equation; and then inserting the vertices into the predetermined equation.

7. The method of claim 6, wherein changing at least one live factor includes replacing the weighting function $\alpha(n)$ with a modified weighting function $\epsilon(n)$.

8. A computer-implemented method for use in rendering a 3D surface, the method comprising:

obtaining an initial digital data set that defines a base mesh coarsely approximating the 3D surface, where the base mesh includes vertices connected to form 2D faces;

subdividing the 2D faces of the base mesh one or more times to form one or more subdivision meshes, where each subdivision mesh more closely approximates the 3D surface than each preceding mesh, and where each subdivision mesh includes more vertices than each preceding mesh;

for each subdivision mesh, applying a computer-implemented algorithm to the vertices in the subdivision mesh to project the vertices onto a limit surface that represents the actual shape of the 3D surface, where the projected vertices define a projected surface, and where applying the computer-implemented algorithm includes inserting the vertices in the subdivision mesh into a predetermined equation that includes a factor that accounts for the projection of the vertices onto the limit surface and that is calculated by solving the following equation:

$$\varepsilon(n) = \frac{3n}{4a(n)},$$

where $$a(n) = \frac{5}{8} - \frac{(3 + 2\cos(2\pi/n))^2}{64},$$

and where n represents the number of vertices in a neighborhood surrounding a particular vertex; and for each subdivision mesh, rendering an image of the projected surface instead of an image of the subdivision mesh.

9. A computer-implemented method for use in rendering a 3D surface, the method comprising:

obtaining an initial digital data set that defines a base mesh coarsely approximating the 3D surface, where the base mesh includes vertices connected to form 2D faces;

subdividing the 2D faces of the base mesh one or more times to form one or more subdivision meshes, where each subdivision mesh more closely approximates the 3D surface than each preceding mesh, and where each subdivision mesh includes more vertices than each preceding mesh;

for each subdivision mesh, applying a computer-implemented algorithm to the vertices in the subdivision mesh to project the vertices onto a limit surface that represents the actual shape of the 3D surface, where the projected vertices define a projected surface, and where applying the computer-implemented algorithm includes inserting the vertices into the following equation:

$$v^{r+1} = \frac{\varepsilon(n)v^r + v_1^r + \cdots + v_n^r}{\varepsilon(n) + n},$$

where n represents the number of vertices in a neighborhood surrounding a particular vertex $v^r$, where r represents the number of subdivisions applied to the bash mesh to derive the subdivision mesh, and where $\varepsilon(n)$ is a weighting function described by the equation:

$$\varepsilon(n) = \frac{3n}{4a(n)},$$

where $$a(n) = \frac{5}{8} - \frac{(3 + 2\cos(2\pi/n))^2}{64};$$

and for each subdivision mesh, rendering an image of the projected surface instead of an image of the subdivision mesh.

10. A computer-implemented method for use in rendering a 3D surface, the method comprising:

obtaining an initial digital data set that defines a base mesh coarsely approximating the 3D surface, where the base mesh includes vertices connected to form 2D faces;

subdividing the 2D faces of the base mesh one or more times to form one or more subdivision meshes, where each subdivision mesh more closely approximates the 3D surface than each preceding mesh, where each subdivision mesh includes more vertices than each preceding mesh, and where subdividing includes inserting the vertices from a mesh to be subdivided into a predetermined equation;

for each subdivision mesh, applying a computer-implemented algorithm to the vertices in the subdivision mesh to project the vertices onto a limit surface that represents the actual shape of the 3D surface, where the projected vertices define a projected surface, where applying the computer-implemented algorithm includes replacing the weighting function $\alpha(n)$ in the predetermined equation with a modified weighting function $\epsilon(n)$ and then inserting the vertices into the predetermined equation, and where the modified weighting function $\epsilon(n)$ is calculated according to the following equation:

$$\varepsilon(n) = \frac{3n}{4a(n)},$$

where $$a(n) = \frac{5}{8} - \frac{(3 + 2\cos(2\pi/n))^2}{64};$$

and for each subdivision mesh, rendering an image of the projected surface instead of an image of the subdivision mesh.

11. A computer program, residing on a tangible storage medium, for use in rendering a 3D surface, the program comprising executable instructions that enable a computer to:

obtain an initial digital data set that defines a base mesh coarsely approximating the 3D surface, where the base mesh includes vertices connected to form 2D faces;

subdivide the 2D faces of the base mesh one or more times to form one or more subdivision meshes, where each subdivision mesh more closely approximates the 3D surface than each preceding mesh, and where each subdivision mesh includes more vertices than each preceding mesh;

for each subdivision mesh, apply a computer-implemented algorithm to the vertices in the subdivision mesh to project the vertices onto a limit surface that represents the actual shape of the 3D surface, where the projected vertices define a projected surface; and for each subdivision mesh, render an image of the projected surface instead of an image of the subdivision mesh.

12. The program of claim 11, wherein, in applying the computer-implemented algorithm, the computer, for each subdivision mesh, inserts the vertices for the subdivision mesh into a predetermined equation.

13. The program of claim 12, wherein the equation includes a factor that accounts for the projection of the vertices onto the limit surface.

14. The program of claim 11, wherein, in subdividing, the computer inserts the vertices from a mesh to be subdivided into a predetermined equation.

15. The program of claim 14, wherein, in inserting the vertices from the mesh to be subdivided into a predetermined equation, the computer inserts the vertices into the following equation:

$$v^{r+1} = \frac{\alpha(n)v^r + v_1^r + \cdots + v_n^r}{\alpha(n) + n},$$

where n represents the number of vertices in a neighborhood surrounding a particular vertex $v^r$, where r represents the number of subdivisions applied to the bash mesh to derive the subdivision mesh, and where $\alpha(n)$ is a weighting function described by the equation:

$$\alpha(n) = \frac{n(1-a(n))}{a(n)},$$

where $$a(n) = \frac{5}{8} - \frac{(3+2\cos(2\pi/n))^2}{64}.$$

16. The program of claim 14, wherein, in applying the computer-implemented algorithm to the vertices in a subdivision mesh to project the vertices onto a limit surface, the computer changes at least one factor in the predetermined equation and then inserts the vertices into the predetermined equation.

17. The program of claim 16, wherein, in changing at least one factor, the computer replaces the weighting function α(n) with a modified weighting function ε(n).

18. A computer program, residing on a tangible storage medium, for use in rendering a 3D surface, the program comprising executable instructions that enable a computer to:

obtain an initial digital data set that defines a base mesh coarsely approximating the 3D surface, where the base mesh includes vertices connected to form 2D faces;

subdivide the 2D faces of the base mesh one or more times to form one or more subdivision meshes, where each subdivision mesh more closely approximates the 3D surface than each preceding mesh, and where each subdivision mesh includes more vertices than each preceding mesh;

for each subdivision mesh, apply a computer-implemented algorithm to the vertices in the subdivision mesh to project the vertices onto a limit surface that represents the actual shape of the 3D surface, where the projected vertices define a projected surface, and where, in applying the computer-implemented algorithm, the computer inserts the vertices in the subdivision mesh into a predetermined equation that includes a factor that accounts for the projection of the vertices onto the limit surface and that is calculated by solving the following equation:

$$\varepsilon(n) = \frac{3n}{4a(n)},$$

where $$a(n) = \frac{5}{8} - \frac{(3+2\cos(2\pi/n))^2}{64},$$

and where n represents the number of vertices in a neighborhood surrounding a particular vertex; and for each subdivision mesh, render an image of the projected surface instead of an image of the subdivision mesh.

19. A computer program, residing on a tangible storage medium, for use in rendering a 3D surface, the program comprising executable instructions that enable a computer to:

obtain an initial digital data set that defines a base mesh coarsely approximating the 3D surface, where the base mesh includes vertices connected to form 2D faces;

subdivide the 2D faces of the base mesh one or more times to form one or more subdivision meshes, where each subdivision mesh more closely approximates the 3D surface than each preceding mesh, and where each subdivision mesh includes more vertices than each preceding mesh;

for each subdivision mesh, apply a computer-implemented algorithm to the vertices in the subdivision mesh to project the vertices onto a limit surface that represents the actual shape of the 3D surface, where the projected vertices define a projected surface, and where, in applying the computer-implemented algorithm, the computer inserts the vertices into the following equation:

$$v^{r+1} = \frac{\varepsilon(n)v^r + v_1^r + \cdots + v_n^r}{\varepsilon(n) + n},$$

where n represents the number of vertices in a neighborhood surrounding a particular vertex $v^r$, where r represents the number of subdivisions applied to the bash mesh to derive the subdivision mesh, and where ε(n) is a weighting function described by the equation:

$$\varepsilon(n) = \frac{3n}{4a(n)},$$

where $$a(n) = \frac{5}{8} - \frac{(3+2\cos(2\pi/n))^2}{64};$$

and for each subdivision mesh, render an image of the projected surface instead of an image of the subdivision mesh.

20. A computer program, residing on a tangible storage medium, for use in rendering a 3D surface, the program comprising executable instructions that enable a computer to:

obtain an initial digital data set that defines a base mesh coarsely approximating the 3D surface, where the base mesh includes vertices connected to form 2D faces;

subdivide the 2D faces of the base mesh one or more times to form one or more subdivision meshes, where each subdivision mesh more closely approximates the 3D surface than each preceding mesh, where each subdivision mesh includes more vertices than each preceding mesh, and where, in subdividing, the computer inserts the vertices from a mesh to be subdivided into a predetermined equation;

for each subdivision mesh, apply a computer-implemented algorithm to the vertices in the subdivision mesh to project the vertices onto a limit surface that represents the actual shape of the 3D surface, where the projected vertices define a projected surface, where, in applying the computer-implemented algorithm, the computer replaces the weighting function α(n) in the predetermined equation with a modified weighting function ε(n) and then inserts the vertices into the predetermined equation, and where the modified weighting function ε(n) is calculated according to the following equation:

$$\varepsilon(n) = \frac{3n}{4a(n)},$$

where $$a(n) = \frac{5}{8} - \frac{(3 + 2\cos(2\pi/n))^2}{64};$$

and for each subdivision mesh, render an image of the projected surface instead of an image of the subdivision mesh.

21. A computer system comprising:

a processor and a memory device coupled to a system bus;

a display device operable to display rendered images of a 3D surface;

a graphics controller configured to receive data from the system bus and use the data in rendering the 3D surface on the display device; and a 3D graphics program loaded into the memory device to assist the processor in delivering the data to the graphics controller, the 3D graphics program comprising executable instructions that cause the processor to:

obtain an initial digital data set that defines a base mesh coarsely approximating the 3D surface, where the base mesh includes vertices connected to form 2D faces;

subdivide the 2D faces of the base mesh one or more times to form one or more subdivision meshes, where each subdivision mesh more closely approximates the 3D surface than each preceding mesh, and where each subdivision mesh includes more vertices than each preceding mesh;

for each subdivision mesh, apply a computer-implemented algorithm to the vertices in the subdivision mesh to project the vertices onto a limit surface that represents the actual shape of the 3D surface, where the projected vertices define a projected surface; and for each subdivision mesh, render an image of the projected surface instead of an image of the subdivision mesh.

22. The system of claim 21, wherein, in applying the computer-implemented algorithm, the processor, for each subdivision mesh, inserts the vertices for the subdivision mesh into a predetermined equation.

23. The system of claim 22, wherein the equation includes a factor that accounts for the projection of the vertices onto the limit surface.

24. The system of claim 21, wherein, in subdividing, the processor inserts the vertices from a mesh to be subdivided into a predetermined equation.

25. The system of claim 24, wherein, in inserting the vertices from the mesh to be subdivided into a predetermined equation, the processor inserts the vertices into the following equation:

$$v^{r+1} = \frac{\alpha(n)v^r + v_1^r + \cdots + v_n^r}{\alpha(n) + n},$$

where n represents the number of vertices in a neighborhood surrounding a particular vertex $v^r$, where r represents the number of subdivisions applied to the bash mesh to derive the subdivision mesh, and where $\alpha(n)$ is a weighting function described by the equation:

$$\alpha(n) = \frac{n(1 - a(n))}{a(n)},$$

where $$a(n) = \frac{5}{8} - \frac{(3 + 2\cos(2\pi/n))^2}{64}.$$

26. The system of claim 24, wherein, in applying the computer-implemented algorithm to the vertices in a subdivision mesh to project the vertices onto a limit surface, the processor changes at least one factor in the predetermined equation and then inserts the vertices into the predetermined equation.

27. The system of claim 26, wherein, in changing at least one factor, the processor replaces the weighting function $\alpha(n)$ with a modified weighting function $\epsilon(n)$.

28. A computer system comprising:

a processor and a memory device coupled to a system bus;

a display device operable to display rendered images of a 3D surface;

a graphics controller configured to receive data from the system bus and use the data in rendering the 3D surface on the display device; and a 3D graphics program loaded into the memory device to assist the processor in delivering the data to the graphics controller, the 3D graphics program comprising executable instructions that cause the processor to:

obtain an initial digital data set that defines a base mesh coarsely approximating the 3D surface, where the base mesh includes vertices connected to form 2D faces;

subdivide the 2D faces of the base mesh one or more times to form one or more subdivision meshes, where each subdivision mesh more closely approximates the 3D surface than each preceding mesh, and where each subdivision mesh includes more vertices than each preceding mesh;

for each subdivision mesh, apply a computer-implemented algorithm to the vertices in the subdivision mesh to project the vertices onto a limit surface that represents the actual shape of the 3D surface, where the projected vertices define a projected surface, and where, in applying the computer-implemented algorithm, the processor inserts the vertices in the subdivision mesh into a predetermined equation that includes a factor that accounts for the projection of the vertices onto the limit surface and that is calculated by solving the following equation:

$$\varepsilon(n) = \frac{3n}{4a(n)},$$

where $$a(n) = \frac{5}{8} - \frac{(3 + 2\cos(2\pi/n))^2}{64},$$

and where n represents the number of vertices in a neighborhood surrounding a particular vertex; and for each subdivision mesh, render an image of the projected surface instead of an image of the subdivision mesh.

29. A computer system comprising:

a processor and a memory device coupled to a system bus;

a display device operable to display rendered images of a 3D surface;

a graphics controller configured to receive data from the system bus and use the data in rendering the 3D surface on the display device; and a 3D graphics program loaded into the memory device to assist the processor in delivering the data to the graphics controller, the 3D graphics program comprising executable instructions that cause the processor to:

obtain an initial digital data set that defines a base mesh coarsely approximating the 3D surface, where the base mesh includes vertices connected to form 2D faces;

subdivide the 2D faces of the base mesh one or more times to form one or more subdivision meshes, where each subdivision mesh more closely approximates the 3D surface than each preceding mesh, and where each subdivision mesh includes more vertices than each preceding mesh;

for each subdivision mesh, apply a computer-implemented algorithm to the vertices in the subdivision mesh to project the vertices onto a limit surface that represents the actual shape of the 3D surface, where the projected vertices define a projected surface, and where, in applying the computer-implemented algorithm, the processor inserts the vertices into the following equation:

$$v^{r+1} = \frac{\varepsilon(n)v^r + v_1^r + \cdots + v_n^r}{\varepsilon(n) + n},$$

where n represents the number of vertices in a neighborhood surrounding a particular vertex $v^r$, where r represents the number of subdivisions applied to the bash mesh to derive the subdivision mesh, and where $\epsilon(n)$ is a weighting function described by the equation:

$$\varepsilon(n) = \frac{3n}{4a(n)},$$

where $$a(n) = \frac{5}{8} - \frac{(3 + 2\cos(2\pi/n))^2}{64};$$

for each subdivision mesh, render an image of the projected surface instead of an image of the subdivision mesh.

30. A computer system comprising:

a processor and a memory device coupled to a system bus;

a display device operable to display rendered images of a 3D surface;

a graphics controller configured to receive data from the system bus and use the data in rendering the 3D surface on the display device; and a 3D graphics program loaded into the memory device to assist the processor in delivering the data to the graphics controller, the 3D graphics program comprising executable instructions that cause the processor to:

obtain an initial digital data set that defines a base mesh coarsely approximating the 3D surface, where the base mesh includes vertices connected to form 2D faces;

subdivide the 2D faces of the base mesh one or more times to form one or more subdivision meshes, where each subdivision mesh more closely approximates the 3D surface than each preceding mesh, where each subdivision mesh includes more vertices than each preceding mesh, and where, in subdividing, the processor inserts the vertices from a mesh to be subdivided into a predetermined equation;

for each subdivision mesh, apply a computer-implemented algorithm to the vertices in the subdivision mesh to project the vertices onto a limit surface that represents the actual shape of the 3D surface, where the projected vertices define a projected surface, where, in applying the computer-implemented algorithm, the processor replaces the weighting function $\alpha(n)$ in the predetermined equation with a modified weighting function $\epsilon(n)$ and then inserts the vertices into the predetermined equation, and where the modified weighting function $\epsilon(n)$ is calculated according to the following equation:

$$\varepsilon(n) = \frac{3n}{4a(n)},$$

where $$a(n) = \frac{5}{8} - \frac{(3 + 2\cos(2\pi/n))^2}{64};$$

and for each subdivision mesh, render an image of the projected surface instead of an image of the subdivision mesh.

* * * * *